US006530032B1

(12) United States Patent
Shew et al.

(10) Patent No.: US 6,530,032 B1
(45) Date of Patent: Mar. 4, 2003

(54) NETWORK FAULT RECOVERY METHOD AND APPARATUS

(75) Inventors: Stephen D. Shew, Kanata (CA); Kenneth G. Hayward, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/401,919

(22) Filed: Sep. 23, 1999

(51) Int. Cl.[7] ................................................ G06F 11/20
(52) U.S. Cl. ........................ 714/4; 709/239; 370/218; 370/222; 370/225
(58) Field of Search ................... 714/4; 709/239–242; 370/216, 217, 218–221, 222–228

(56) References Cited

U.S. PATENT DOCUMENTS

| | | | | |
|---|---|---|---|---|
| 5,995,485 A | * | 11/1999 | Croslin | 370/216 |
| 6,075,766 A | * | 6/2000 | Croslin | 370/225 |
| 6,134,671 A | * | 10/2000 | Commerford et al. | 370/216 |
| 6,137,774 A | * | 10/2000 | Commerford et al. | 370/216 |
| 6,327,669 B1 | * | 12/2001 | Croslin | 709/238 |
| 6,374,303 B1 | * | 4/2002 | Armitage et al. | 370/390 |
| 6,430,150 B1 | * | 8/2002 | Azuma et al. | 370/218 |

OTHER PUBLICATIONS

Multiprotocol Label Switching Architecture, Eric C. Rosen et al, Apr. 1999, pp. 1–62.
A Framework For Multiprotocol Label Switching, R. Callon et al, Nov. 21, 1997, pp. 1–65.

* cited by examiner

Primary Examiner—Scott Baderman

(57) ABSTRACT

The present invention provides layer one, two and three (L1/L2/L3) Integration and L1 cut-through path utilization in an apparatus and method of fault recovery. A switch combines an IP router with L2 capabilities, and an L1 cross connect (optical or electrical). A network of such switches is configured with label switched paths (LSP) that correspond to layer 1 (L1) cut-through paths. The layer 2 (L2) cut-through path is over laid on the L1 cut-through path and the L2 cut-through path is used for IP data flows. Preferably, the L2 cut-through paths are defined as label switched paths (LSP) and the L1 cut-through paths are each an end-to-end path established with L1 cross connects associated with each switch.

36 Claims, 19 Drawing Sheets

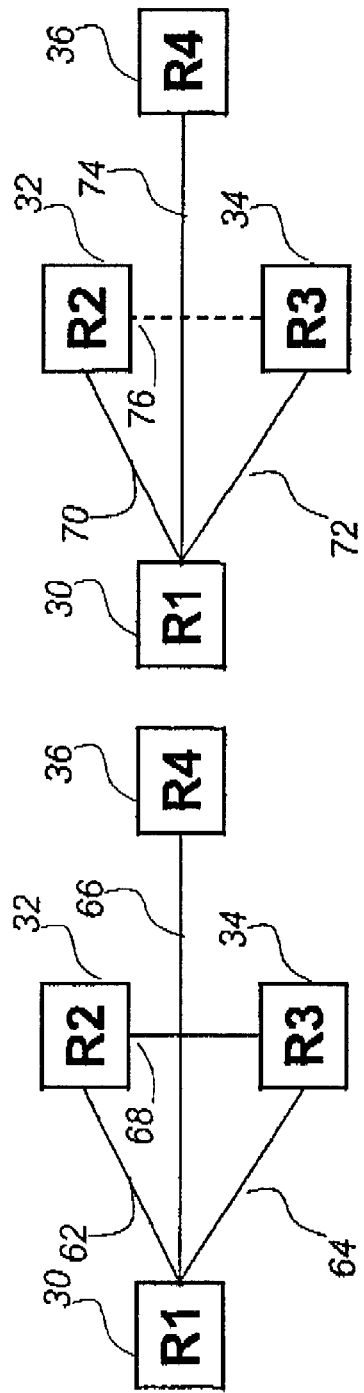
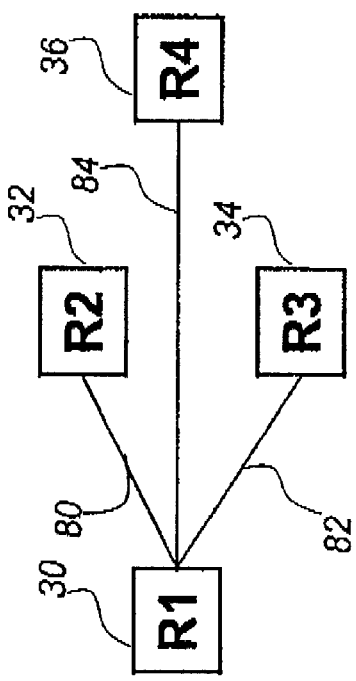
Fig. 3 a)
Fig. 3 b)
Fig. 3 c)
OSPF Links
Link with static routes Logical Full-Mesh Topology Logical Topology after fiber cut between R1-R6

Physical Topology

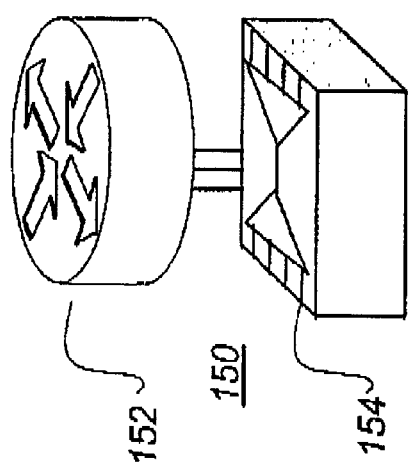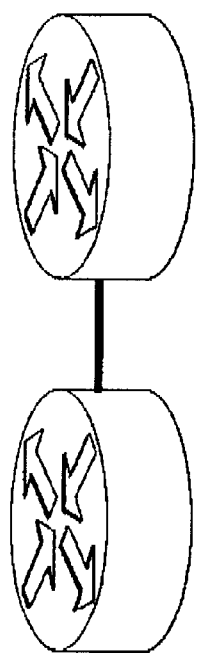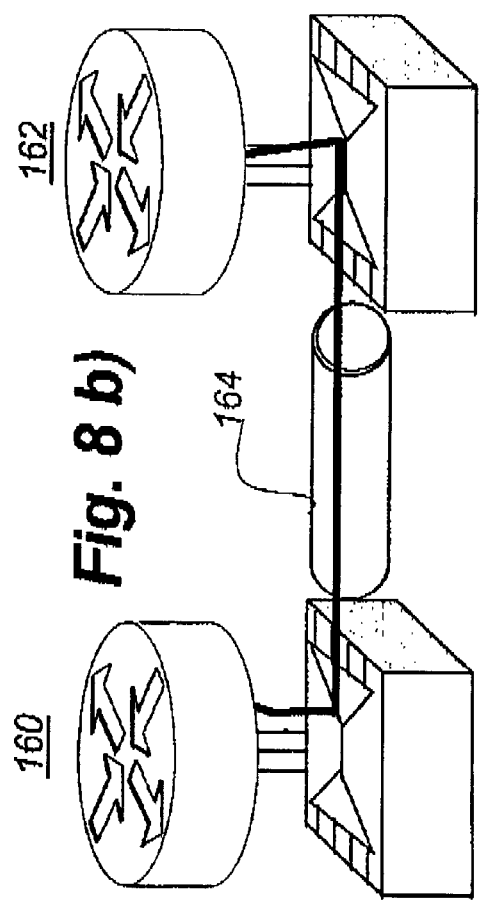

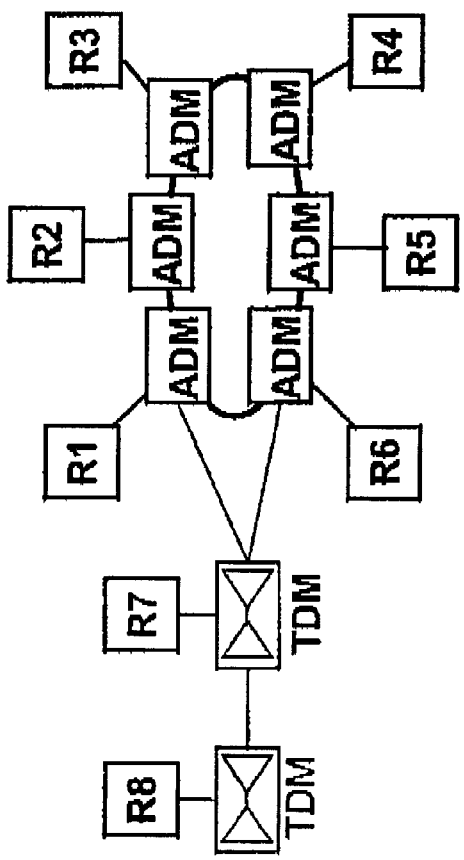
*Fig. 9 a)* Physical Topology
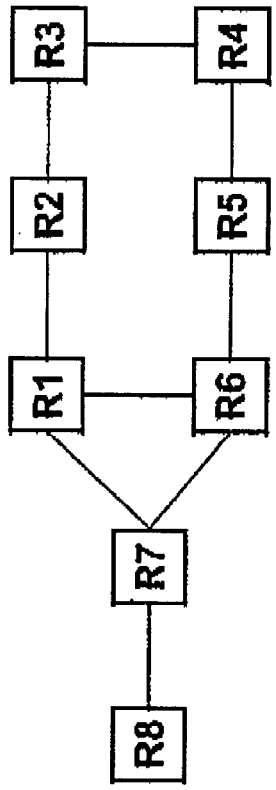
*Fig. 9 b)* Router Topology

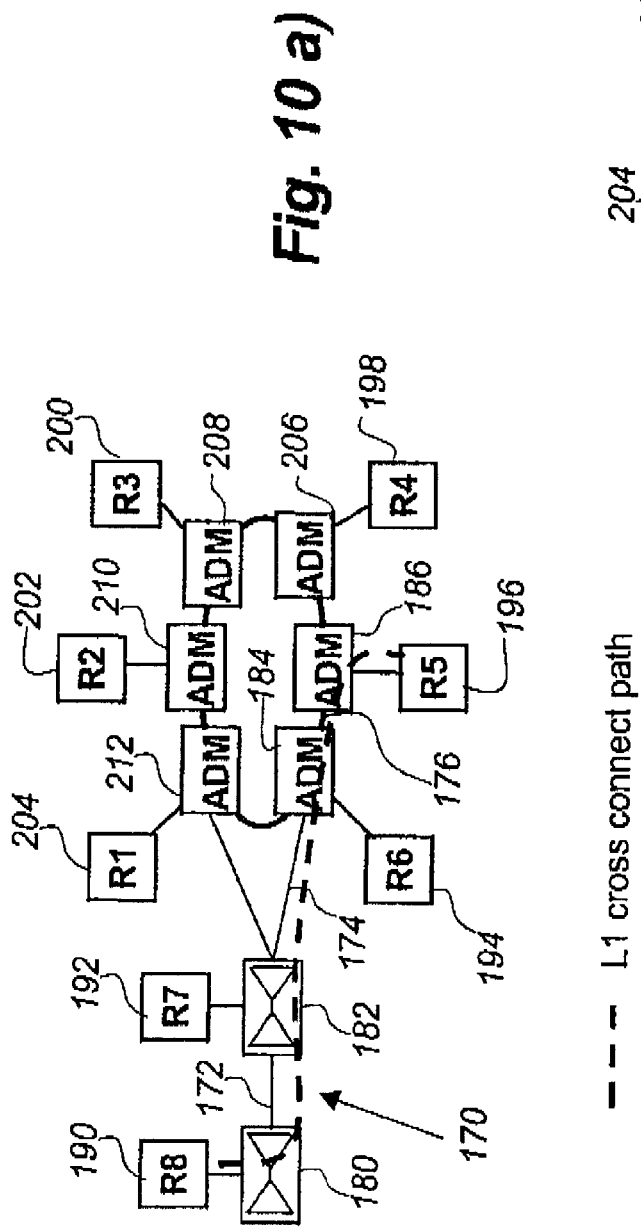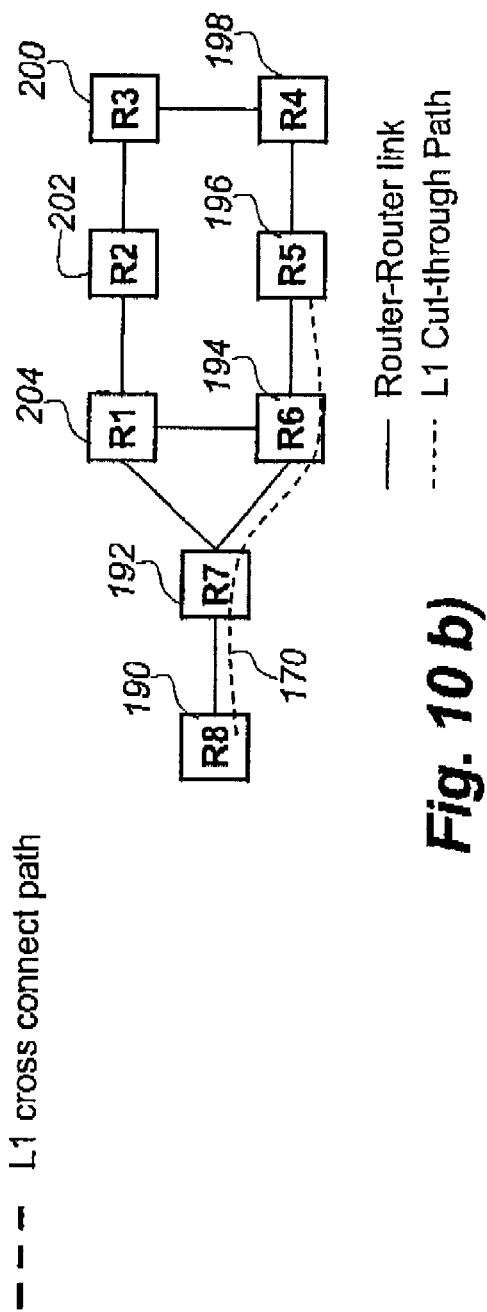
Fig. 10 a)
Fig. 10 b)
— Router-Router link
---- L1 Cut-through Path
– – – L1 cross connect path

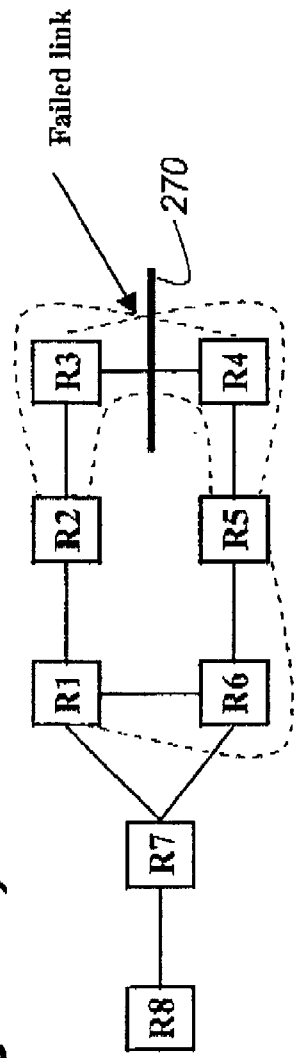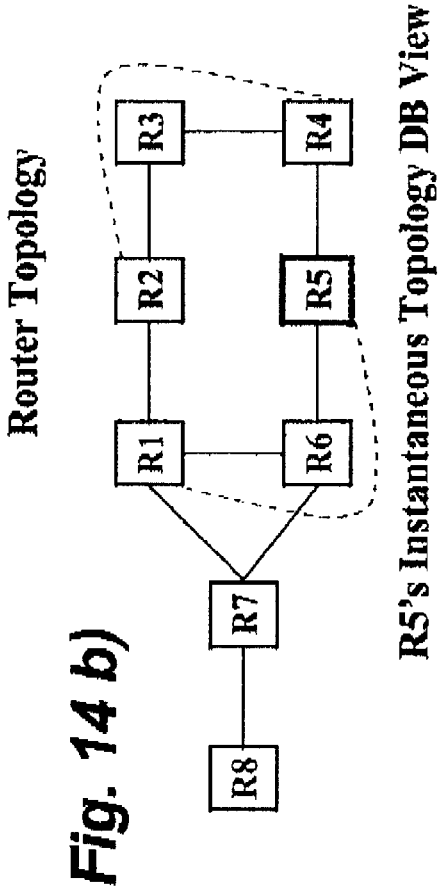
Fig. 14 a) Router Topology
Fig. 14 b) R5's Instantaneous Topology DB View R5 finds L1 cut-through on BRS for failed L1 cut-through R5-R4-R3-R2

R5 sets up LSP to R2

NETWORK FAULT RECOVERY METHOD AND APPARATUS

FIELD OF THE INVENTION

The present invention relates to network fault recovery method and apparatus and is particularly concerned with recovery at higher layers from physical layer faults.

BACKGROUND OF THE INVENTION

Currently, the traffic reliability of large telecommunications networks such as core networks used for Internet service providers (ISPs) or for major corporate backbones is dependent upon the traffic protection resources built into the network elements. To ensure that the desired availability of network connections is maintained and protected, it is standard practice in the telecommunications industry to rely on routing algorithms for handling link or equipment failures. However, with a typical failure reaction time of 30 seconds, conventional routing protocols are inherently too slow for today's high speed networks. This results in inappropriate transmission down time, particularly for video and voice transmission.

A faster solution conventionally used to protect network connections consists of implementing protection in the physical layer (layer 1) of the network by installing redundant equipment so that if one physical link fails, another can rapidly be switched into place.

By contrast to relying on the routing protocols for protecting the availability of network connections, the installation of redundant equipment results in a much faster failure reaction time which, for example in SONET rings is usually in the neighbourhood of 50 milliseconds.

Redundancy of equipment has long been accepted by carrier grade networks as a way to ensure availability and reliability. However networks not requiring carrier grade protection, still desire rapid recovery from physical failures, particularly in high throughput links such as carried in optical fiber, e.g. OC-192.

However, the use of redundant layer 1 equipment for protection presents a number of disadvantages. First, more network links must be installed. For example, current protection configurations which require the installation of additional fiber links between network nodes include dedicated protection (1 protection fiber for each fiber link also referred to as 1:1 protection), shared protection (1 protection fiber for N fiber links or 1:N protection) and ring protection.

The accommodation of multiple fiber links necessitates replicating some of the equipment relating to optical link budgets at each network node. Duplicating this equipment may prove to have a major impact on the overall cost of the network.

In addition to the high cost associated with installing additional equipment for traffic protection, another drawback of the use of redundant layer 1 equipment is that the additional bandwidth capacity created therefrom is exclusively dedicated to traffic protection and remains unused, or is pre-emptable, in the absence of network failures. This increases the cost of the bandwidth.

In view of the slow reaction time of the routing protocols, the high cost and the inefficient bandwidth management associated with the use of additional layer 1 equipment, it is desirable to provide a cost-effective and efficient protection mechanism which provides adequate reaction time to failures and maximizes the utilization of the available resources present in the network.

SUMMARY OF THE INVENTION

An object of the present invention is to provide an improved network fault recovery method and apparatus.

In accordance with the present invention L1/L2/L3 Integration and L1 cut-through path utilization are provided in an apparatus and method of fault recovery.

In accordance with an aspect of the present invention there is provided a switch which combines an IP router with L2 capabilities, and an L1 cross connect (optical or electrical).

In accordance with another aspect of the invention there is provided a network in which switches are configured with label switched paths (LSPS) that correspond to layer 1 (L1) cut-through paths.

Conveniently, a layer 2 (L2) cut-through path is over laid on the L1 cut-through path and the L2 cut-through path is used for IP data flows.

Preferably, the L2 cut-through paths are defined as label switched paths (LSPs). And the L1 cut-through paths are each an end-to-end path established with L1 cross connects associated with each switch.

In accordance with another aspect of the present invention a method is provided in which upon failure of a physical link, all LSP endpoints associated with affected L1 cut-through paths are notified by physical detection methods.

Preferably, label switch paths are defined corresponding to a respective L1 cut-through path, the MPLS entity managing an LSP is notified of LSP failures that correspond to L1 cut-through path failure, and backup procedures are then executed to restore IP forwarding.

According to an aspect of the present invention there is provided a method of fault recovery for a network including the steps of establishing a physical topology for the network, aligning a logical topology for the network with the physical topology, and using a fault indication from the physical topology to effect fault recovery in the logical topology.

In accordance with another aspect of the present invention there is provided an apparatus for data networking comprising a cross connect for switching at a physical layer, a router for redirecting data packets at a logical layer coupled to the cross connect, and a fault recovery mechanism responsive to a fault indication in the physical layer for effecting a recovery in the logical layer.

Conveniently, the router includes an internetworking protocol (IP).

Preferably, the internetworking protocol includes multi-protocol label switching (MPLS).

In accordance with another aspect of the present invention there is provided a network comprising a plurality of nodes, each node including a cross connect for switching at a physical layer, a router for redirecting data packets at a logical layer coupled to the cross connect and a fault recovery mechanism responsive to a fault indication in the physical layer for effecting a recovery in the logical layer, a plurality of physical connections between nodes via the respective cross connects, a plurality of logical routes between nodes via the respective routers, and an alternative logical route for use by the fault recovery mechanism.

In accordance with another embodiment of the present invention there is provided in a network including a plurality of nodes and having a plurality of communications layers, a method of providing fault recovery comprising the steps of aligning at least a first and second layer of the plurality of communications layers, for a given path in the first layer, defining a corresponding path in the second layer and an alternative path in the second layer, the alternative path in the second layer corresponding to an alternative path in the first layer disjoint from the given path, and on detection in the first layer of a fault in the given path, switching in the second layer from the corresponding path to the alternative path, whereby fault recovery in the network is provided Advantages of the present invention include faster recovery from layer 1 failure than provided by L3 routing algorithms and integration of the layers 1, 2 and 3 networks into a common topology (a network management simplification and potential equipment cost saving).

BRIEF DESCRIPTION OF THE DRAWINGS

The present invention will be further understood from the following detailed description, with reference to the drawings in which:

FIGS. 3a), b) and c) illustrate a physical topology, L3 links and OSPF topology, respectively;

FIGS. 8 a), b), and c) illustrate a switch in accordance with a first embodiment of the present invention and a physical and logical topologies for two such switches;

FIGS. 9 a) and b) illustrate an exemplary network's physical and router topologies made up of switches of FIG. 8;

FIGS. 10 a) and b) illustrate the network of FIG. 9 a) and b) showing a layer 1 (L1) cut-through path. In the network of FIG. 10, a layer 1 cross connected path is treated as a layer 1 cut-through path by the routers;

FIGS. 14 a) and b) illustrate an L1 failure in the network of FIG. 13, and the L3 routing view from the point of router R5;

DETAILED DESCRIPTION

Figure 1:
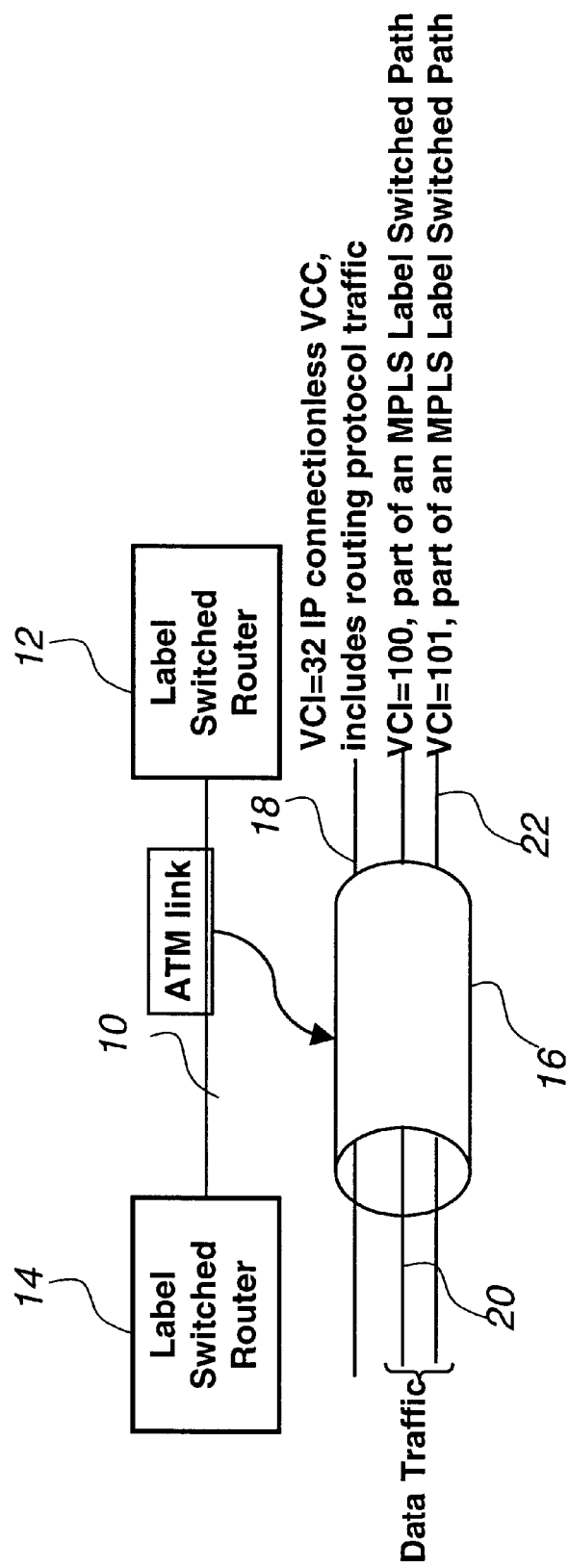
FIG. 1 illustrates a known ATM link between two label switched routers (LSR)

Referring to FIG. 1, there is illustrated a known ATM link between two label switched routers (LSR). An ATM link 10 runs between LSR 12 and LSR14 and as shown in the expanded link section 16, an ATM link typically carries both connectionless traffic 18 and connection oriented traffic such as MPLS label switched paths 20 and 22. In IP router networks, control and data planes are typically not separated.

IP Control Traffic consists of:
Routing protocol messages such as OSPF Hello, OSPF Link State Advertisements
L3 to L2 Address resolution (ARP), flow control (ICMP)
Many other protocols (traceroute, ping, multicast)
IP Data Traffic consists of:
Host-to-host data exchanged via various TCP and UDP protocols (e.g., file transfer with FTP)
Network-to-network data which is carried in TCP or UDP packets (e.g., BGP4 updates)
Typical router-router links 10 carry both control and data traffic, 18. It is possible to separate IP control and data streams. This could be on separate links or could be on separate channels within a channeled link like ATM.

Separation of control and data is seen in MPLS where:
IP routing control is done in a connectionless manner
IP data can be forwarded on Label Switched Paths that are in different channels than IP connectionless control.

Figure 2:
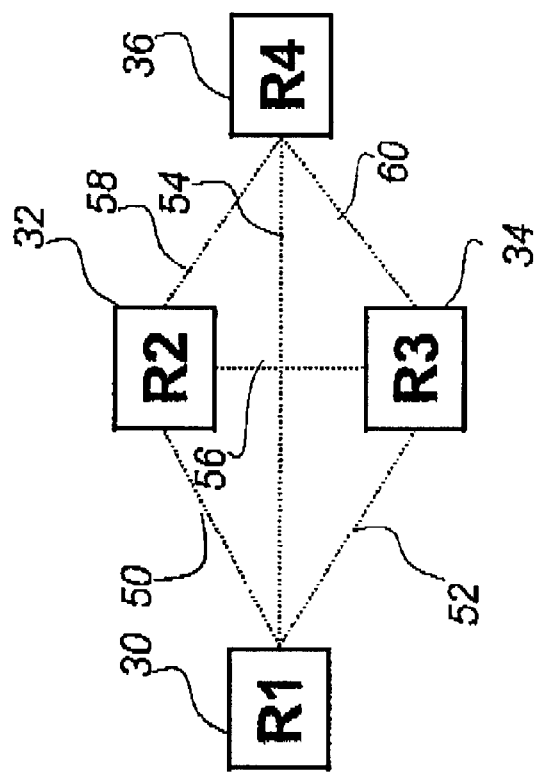
FIGS. 2a) and b) illustrate a network of four routers showing topology and label switched paths respectively.
Figure 2:
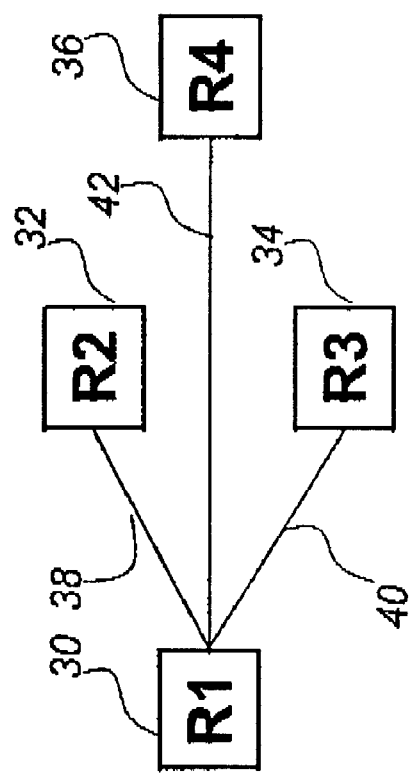

Referring to FIGS. 2a) and b) there are illustrated a network of four routers showing router topology and label switched paths, respectively. In FIG. 2a) routers 30, 32, 34 and 36 are connected by: physical link 38 between routers 30 and 32; physical link 40 between routers 30 and 34; and physical link 42 between routers 30 and 36. In FIG. 2b) routers 30, 32, 34 and 36 are interconnected by: MPLS label switched path (LSP) 50 between routers 30 and 32; LSP 52 between routers 30 and 34; LSP 54 between routers 30 and 36; LSP 56 between routers 32 and 34; LSP 58 between routers 32 and 36; and LSP 60 between routers 34 and 36.

In MPLS, the separation of planes is useful in decoupling the number of IGP (Interior Gateway Protocol ) links from the number of forwarding links in the network.

The Interior Gateway Protocol (i.e., a routing protocol) links carry control traffic for the IGP. Usually the physical topology and the IGP topology coincide as shown in FIG. 2a). MPLS label switched paths are created over physical links to form high mesh connectivity for data forwarding as shown in FIG. 2b).

Referring to FIGS. 3a), b) and c) there are illustrated a physical topology, links topology and OSPF topology database view, respectively.

In FIG. 3a) routers 30, 32, 34 and 36 are connected by: physical link 62 between routers 30 and 32; physical link 64 between routers 30 and 34; physical link 66 between routers 30 and 36; and physical link 68 between routers 32 and 34. In FIG. 3b) routers 30, 32, 34 and 36 are interconnected by links: OSPF link 70 between routers 30 and 32; OSPF link 72 between routers 30 and 34; OSPF link 74 between routers 30 and 36; and static route 76 between routers 32 and 34. In FIG. 3c) the OSPF topology database view of the network consists of: link 80 between routers 30 and 32; link 82 between routers 32 and 36; and link 84 between routers 34 and 36.

In such a network, control and data streams can be separated onto different links. For example, a link 76 between two routers 32 and 34 is used only to carry traffic for static IP routes. No IP routing control traffic passes over this link. However it is not possible to completely separate control and data in this example as other IP control packets could still use the link 76 (e.g., ping).

Currently, L2 and L3 control and data technologies are being combined into IP routers that incorporate switching technologies like ATM. This has made an impact on how packets are forwarded. To understand this impact, L3 forwarding is reviewed.

Figure 4:
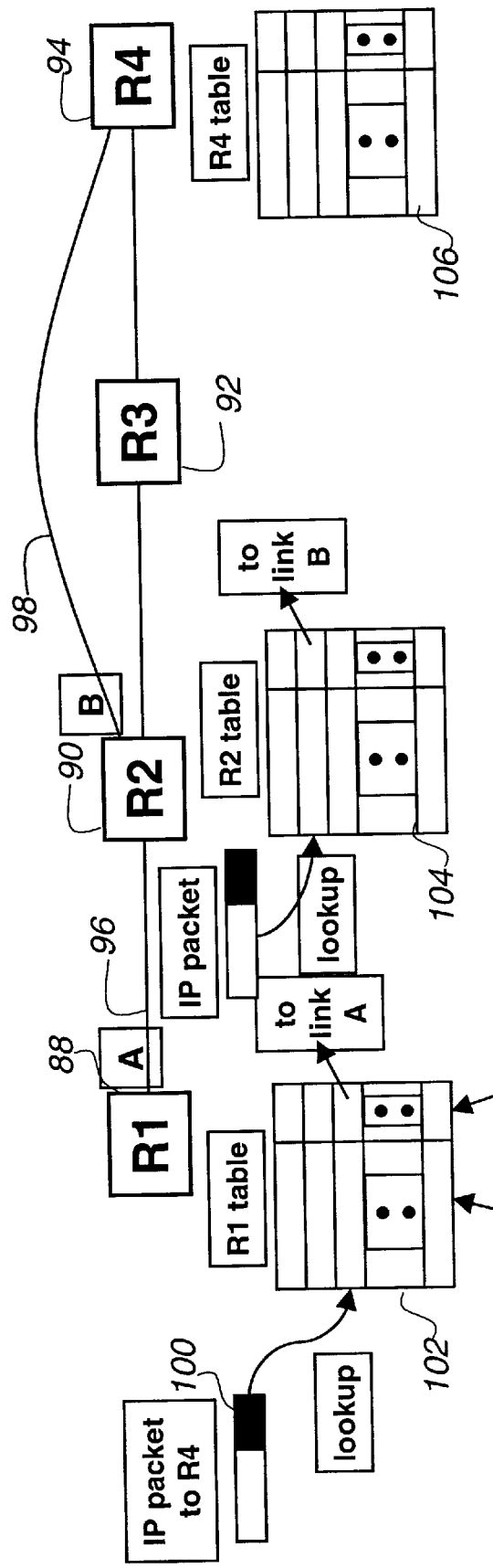
FIG. 4 illustrates connectionless layer 3 internet protocol (IP) forwarding in a network of four routers.

Referring to FIG. 4 there is illustrated a connectionless layer 3 internet protocol (L3 IP) forwarding in a network of four routers. The network includes routers 88, 90, 92 and 94. For the purposes of discussion and simplification only routing over two links, A link 96 and B link 98 are described.

L3 Forwarding takes IP packets, for example packet 100 and performs a lookup on the destination IP address in an IP forwarding table (102, 104, 106), for example R1 table 102 shows link 94, as the next hop. The packet is sent on link A and arrives at router R2 where another lookup on the destination IP address occurs in R2 table 104. The result of that look up is B link, 98, as next hop. A successful lookup results in an identifier for an outgoing link on which to place the packet. This is repeated at each router until a router is reached which directly supports the destination IP address.

In combined L2/L3 switches, instead of forwarding all IP packets in a hop-by-hop connectionless manner, MPLS and other schemes use additions to IP routing control to leverage L2 forwarding for IP packets. This has several advantages including simplicity of the forwarding operation, and the ability to have packets flow along arbitrary paths (as opposed to just shortest). Multi-Protocol Label Switching MPLS provides a method of setting up L2 forwarding in these switches.

Figure 5:
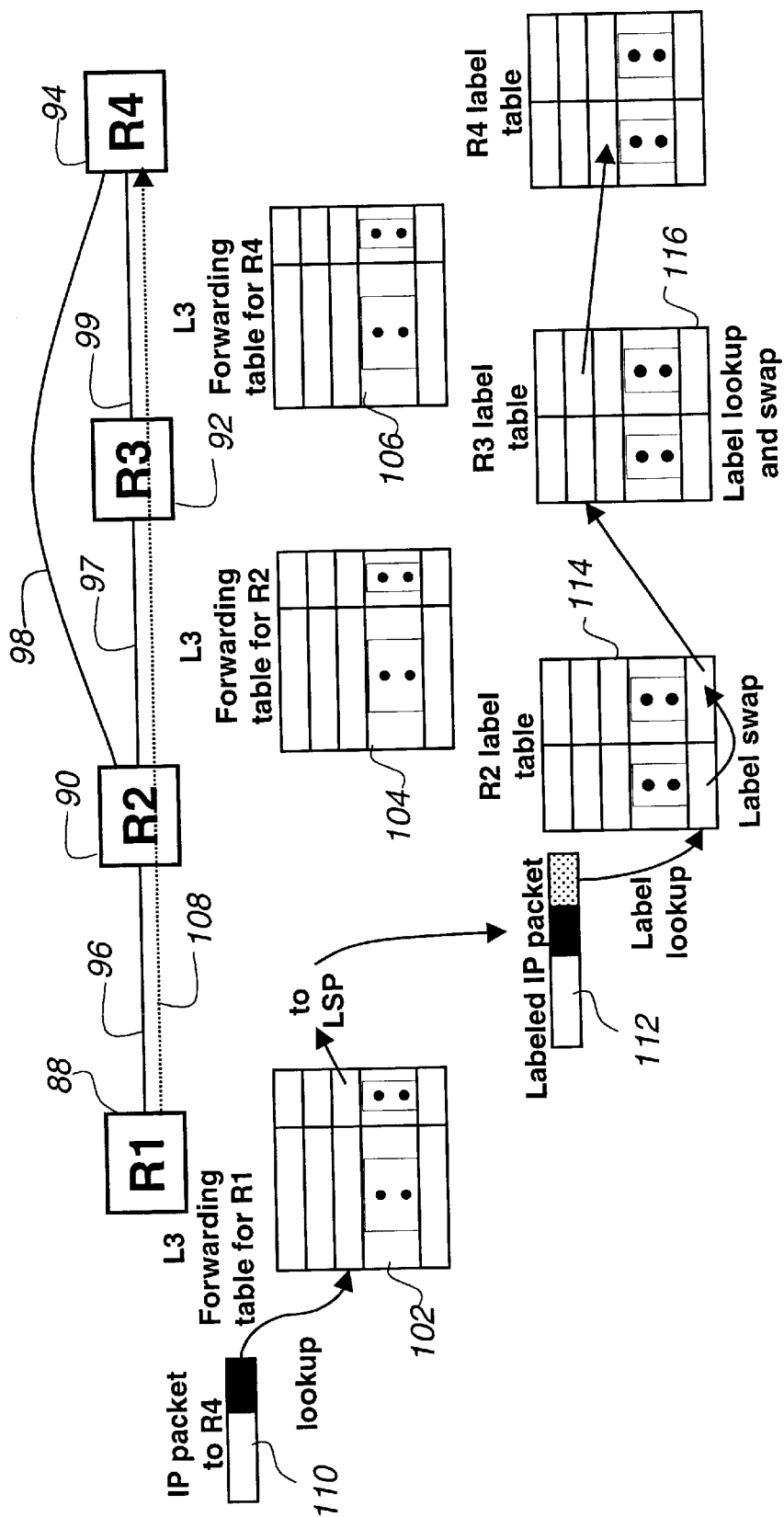
FIG. 5 illustrates label switching in a network of four label switching routers.

Referring to FIG. 5 there is illustrated a label switched router in a network of four label switched routers. For the network of FIG. 4 a label switched path 108 is defined over links 96, 97, and 99. Note that this is not a path that would have been chosen by the shortest path algorithm of an L3 routing protocol like OSPF (assuming each link was equal cost). This constraint is not necessarily imposed on MPLS LSPs.

In operation, after MPLS Label Switched Paths (LSP) are set up, for example LSP 108, IP packets 110 at the start of an LSP undergo an L3 lookup as part of L3 forwarding e.g., table 102. If they match a Forwarding Equivalence Class (FEC), they are sent to the corresponding LSP 108. An MPLS label is added to the packet 112 and it is sent out a link with this encapsulation. At the next MPLS Label Switched Router (LSR), a label swap occurs in a L2 forwarding table 114 (MPLS Incoming Label Map).

MPLS Forwarding Example:

LSP defined over links 96, 97, 99

Packet 110 arriving at R1 88 destined for R4 94 is handled by L3 forwarding 102 and placed on an LSP 108. At R2 90 and R3 92, forwarding is handled by L2 forwarding tables 114 and 116, respectively (i.e., switching, also called label swapping in this context). At R4 94, the final L2 label lookup occurs as this is the end of the LSP. The packet is decapsulated from the MPLS label and passed to the router IP stack for further processing.

This is sometimes called "route once, switch many".

Figure 6:
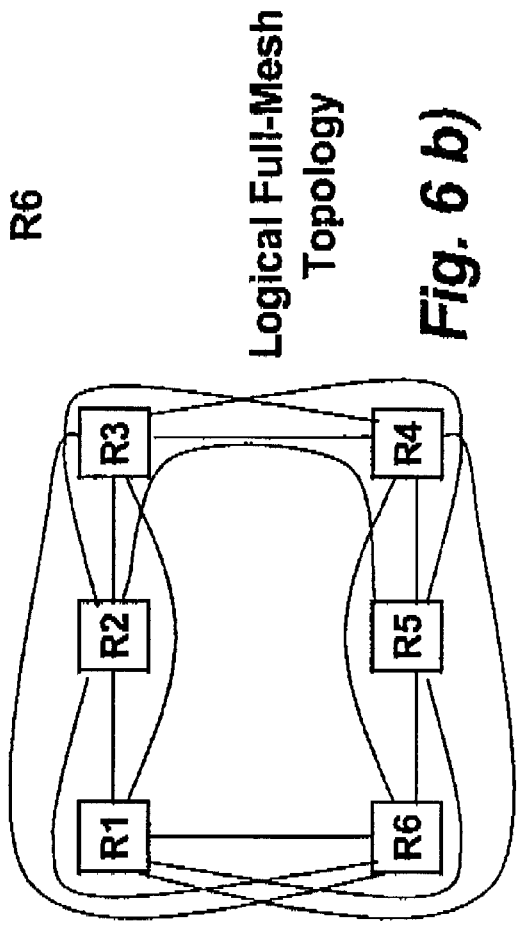
FIGS. 6 a), b) and c) illustrate routers on SONET ring and how they are typically connected.
Figure 6:
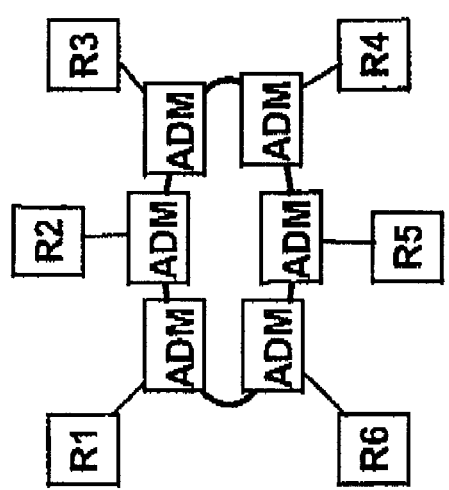
Figure 6:
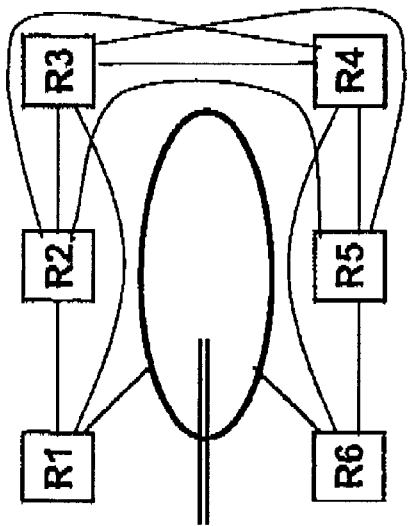

Referring to FIG. 6 there is illustrated an example of a typical network. FIG. 6a) illustrates a physical topology for a SONET ring with attached routers. Routers are connected to Add/Drop Muxes (ADMs) around ring. FIG. 6b) illustrates a typical logical full-mesh router topology configured on the SONET ring. Router networks use link facilities that are paths in an underlying L1 physical network. Some of these paths bypass other routers. If multiple router-router links share the same physical segment at some point, they will all go down if that segment fails. FIG. 6c) illustrates the effect of a SONET ring segment failure on the configured router-router links. Networks using such L1 facilities usually request physical diversity in their link service. However, this is not always possible, for example, routers connected over an unprotected SONET ring. With multiple L3 link failures, it can take seconds for the routing protocol to recover IP forwarding. L3 traffic is held up until shortest paths re-established even though bandwidth and connectivity may exist. Thus the effect of a single link failure in L1 can have large impacts on the L3 topology and the time it takes to recover connectionless forwarding.

Figure 7:
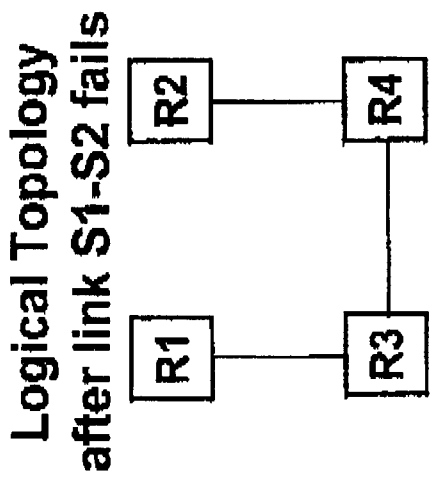
FIGS. 7 a), b), and c) illustrate routers in a TDM overlay.
Figure 7:
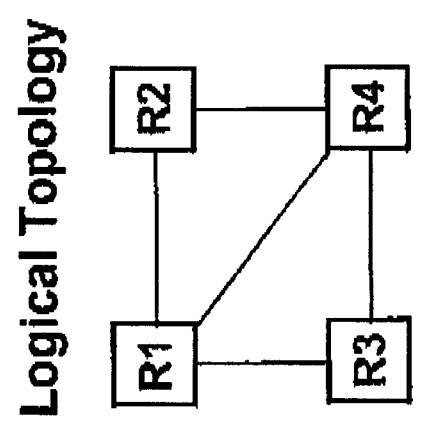
Figure 7:
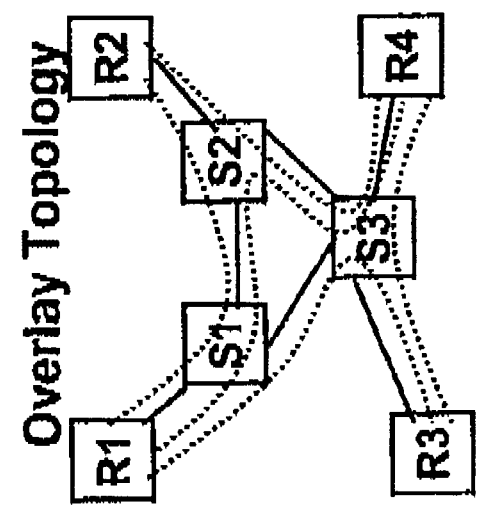

In a network with TDM switches in Layer 1, routers are similarly connected as. SONET networks. Specifically, cross-connect paths are defined for router-router links. In FIG. 7a), TDM switches S1, S2, S3 form the L1 physical network with 3 physical links. Routers use TDM paths setup over those switches and the logical router topology in FIG. 7. b) shows 5 links. When physical link S1–S2 fails, two router-router links are affected (FIG. 7c) because they shared that L1 link for a common portion of their cross connect paths.

DETAILED DESCRIPTION OF EMBODIMENT OF PRESENT INVENTION

Referring to FIGS. 8a), b), and c) there is illustrated a switch in accordance with a first embodiment of the present invention and physical and logical topologies for two such switches. In FIG. 8a) a switch 150 combines an IP label switching router 152 with a layer one (L1) cross connect 154. The switch 150 is defined as a switch that is a traditional IP router 152 (with some L2 switching) linked with an L1 multiplexor/demultiplexor and cross connect 154. For example:

an IP label switching router and a SONET ADM an IP label switching router and a TDM cross connect In this combined switch, traffic can enter the cross connect and pass up to the router where it is forwarded onto another outgoing channel in the cross connect. Traffic can also enter the cross connect and exit without passing up to the router.

FIG. 8b) illustrates a simple network of two switches 160 and 162 of FIG. 8a) connected together by physical link 164, allocating one or more channels to connect the routers on either end of the link. FIG. 8c) illustrates the resulting logical connection between the router portions of the switches of FIG. 8b).

Referring to FIGS. 9a) and b) there are illustrated an exemplary network's physical and router topologies made up of switches of FIG. 8. Integration of L1, L2, and L3 is achieved, i.e., an L1/L2/L3 network is established in the following way.

1. Define an IP network with many interconnected L1/L2/L3 switches. No L1 restoration mechanisms are needed or assumed (e.g., SONET restoral).
2. L3/L2/L1 topologies are aligned. All router-router links are now one physical hop and routers view the physical topology. This network differs from networks where L1 and L2 are separated in that no L1 paths (series of cross connected channels) are used as router-router links.

For L3 forwarding in L1/L2/L3 Network, connectionless forwarding of packets traverses only direct physical links on the router-router channels of those links. L3 connectionless traffic may traverse many hops, e.g., packets from R8 to R3 would traverse R8-R7-R1-R2-R3 in FIG. 9b).

Referring to FIGS. 10a) and b), there is illustrated the network of FIG. 9a) and b) showing a layer 1 (L1) cut-through path. In the network of FIG. 10, an existing use of the L1 path between R8 and R5 would be as a router-router link which carries IP control and data traffic. This is not how this L1 path is used in the present embodiment of this invention.

An L1 cut-through path is illustrated in FIG. 10a). Routers 194, 196, 198, 200, 202, and 204 are each connected to respective add/drop MUXs (ADM) 184, 186, 206, 208, 210, and 212 in a SONET ring 214 without protection. Routers 190 and 192 with TDM fabrics 180 and 182 are linked to ADMs 184 and 212. An L1 cut-through path 170 is defined through cross-connects 180, 182, 184, and 186 associated with routers R8 190, R7 192, R6 194, R5 196.

This is equivalent to a private line between routers R8 and R5.

Other cut-through paths can be defined over shared physical links.

A L1 cut-through path 170 is established as follows:
1) Define a L1 cut-through path 170 that includes normal connections in L1 networks and consists of channels in links 172, 174, and 176 concatenated at cross connect points 180, 182, 184, and 186.
2) Let routers at the L1 cut-through path end points (190 and 196) view L1 cut-through paths as valid next hops available for use in the IP Forwarding table, and not as a router-router links that pass IGP control traffic.

There are two possible ways for the router to view the L1 cut-through path as statically routed links, or, as if they were an L2 switched path (like an MPLS LSP). For example, in the optical domain, paths that bypass SONET boxes are like static LSPs. That is, Label Distribution Protocol cannot create them, and in the optical topology they are analogous to PVCs in an ATM topology.

In a preferred embodiment the router views the L1 cut-through path as an MPLS Label Switched Path. Existence and use of L1 cut-through paths does not preclude the use of MPLS dynamic LSPs. Routers are not aware of L1 cut-through paths that tandem through them (e.g., optical bypass in SONET). In FIG. 10b), router R6 is unaware of the L1 cut-through path 170 defined.

Figure 11:
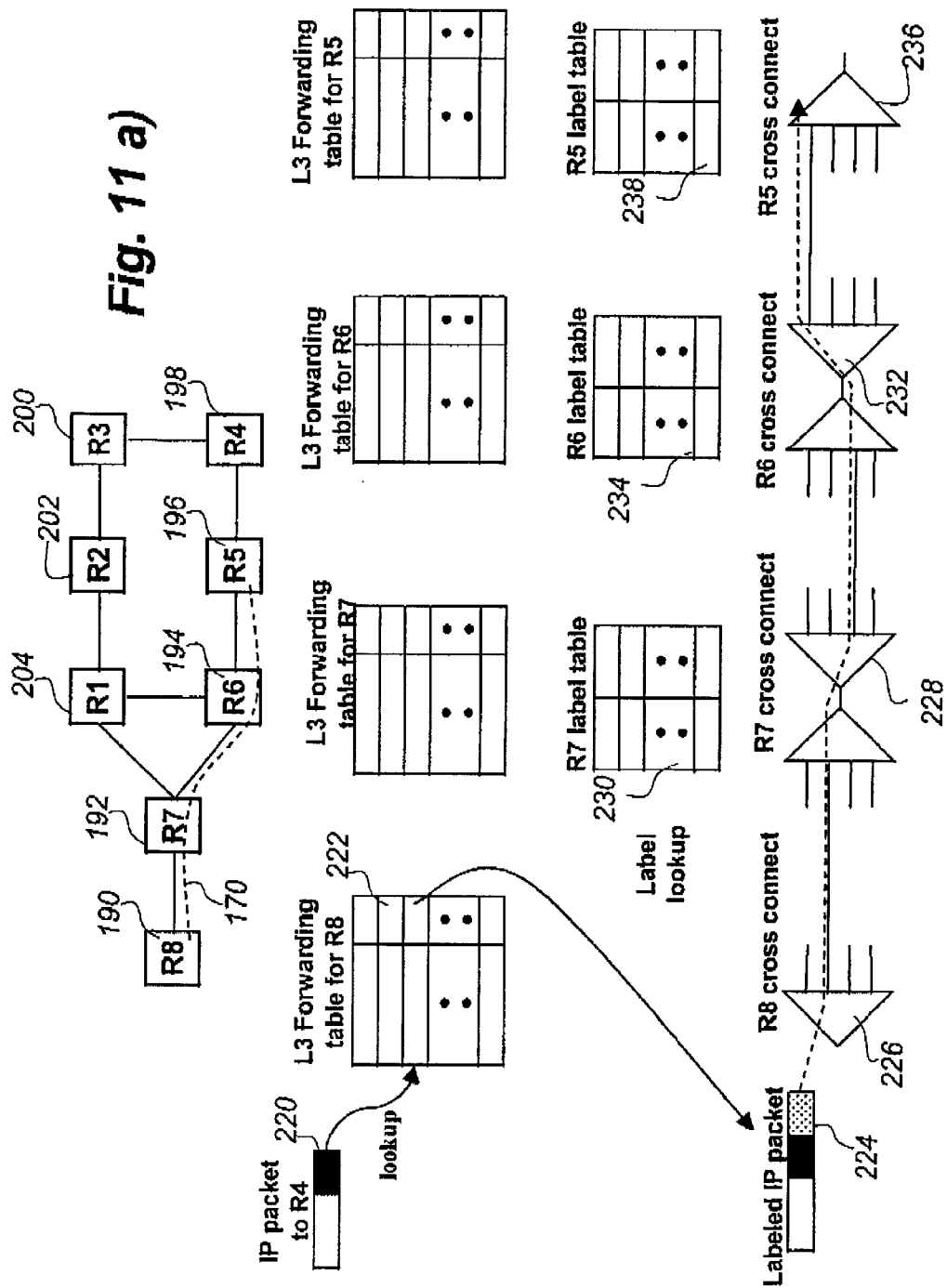
FIGS. 11a) and b) illustrate IP packet forwarding using the L1 cut-through path of FIG. 10b)

Referring to FIGS. 11a) and b) there is illustrated, using the network topology of FIG. 10b), an example of forwarding on the L1 cut-through path of FIG. 10b). L2 Forwarding in L1/L2/L3 network is accomplished by having:
  Routers use L1 cut-through paths by installing ingress points to the path as next hops in the IP Forwarding table.
  Entries in the IP Forwarding table (IP prefixes) can be installed as:
    Static routes. This is for the case where the L1 cut-through path is viewed as a link between two routers that is not part of the routing protocol topology.
    Forwarding Equivalence Class (FEC) elements. This is for the case where the L1 cut-through path is viewed as an MPLS LSP.
  Before going out on the L1 cut-through path, the packet is placed into an L2 frame.
    This framing happens in all routers for the specific L2 which the packet is to be forwarded on.
    The packet is also labelled with an MPLS label as is done for packets being sent down an LSP.

In FIGS. 11a) and b) forwarding on a L1 cut-through path is illustrated. Packet 220 from RS 190 to RS 196 is sent to L1 cut-through path 170 and passes through cross connects 226, 228, 232 and 236, but intermediate switches do not perform label swapping or lookup. The use of the L1 cut-through path thereby eliminates the L3 lookup of connectionless forwarding, as well as the label swapping of L2 forwarding. The packet is unchanged during its transit over the L1 cut-through path.

Figure 12:
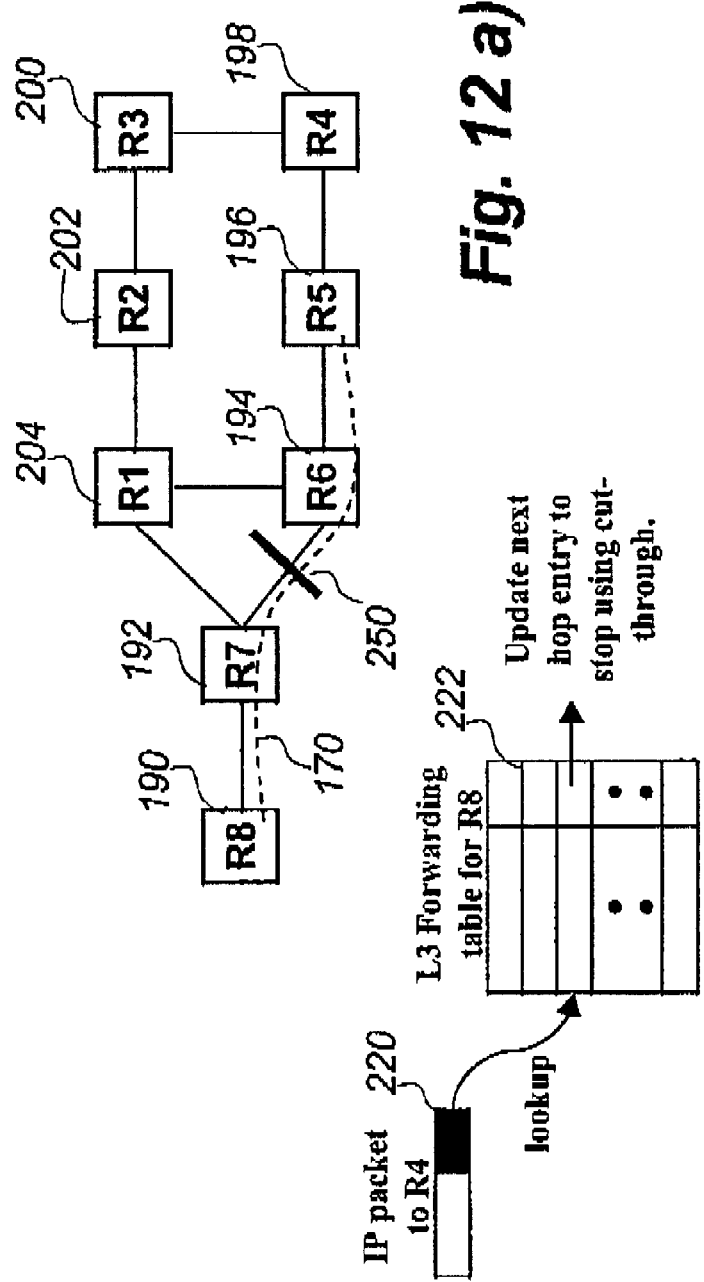
FIGS. 12a) and b) illustrate the effect of an L1 link failure on the use of layer 1 cut-through path by L3 forwarding.

Referring FIGS. 12a) and b) there is illustrated the router topology of FIG. 10a) in which the cut-through path 170 has been broken by a fault condition 250. When a physical link that is carrying multiple L1 cut-through paths fails, each endpoint (R8 190 and R5 196 for L1 cut-through path 170) of all the paths knows about the failure through physical detection methods specific to the cross connect technology.

In the preferred embodiment, an MPSL LSP is associated with every L1 cut-through path, hence a router that detects an L1 cut-through path failure immediately informs the MPLS process that manages the LSP associated with the path. The path failure causes an interrupt that informs the MPLS software process as soon as possible, of the failure. The router can then adjust the affected next hop fields in the L3 forwarding table for the destination IP prefixes, which use the L1 cut-through path, with other valid routes if they exist. This action can take place more quickly at L2 than the L3 routing protocol reaction time to the failed link because the detection method is based on L1 physical layer detection that spans multiple cross connects. In L3 routing protocols, link failure is propagated from the point of failure to routers farther and farther away. This means that a source router which is far from the failure (many hops), some of whose traffic crossed the failed link, does not find out about the failure for some time. In contrast, the LSRs on the endpoints of L1 cut-through paths, which are affected by a L1 link failure, are informed quickly even though they may be several hops away from the failure.

If link 250 (R7-R6) fails, the router R8 190 immediately detects the failure of L1 cut-through path 170 (R8-R7-R6-R5). Next hop entries, for example in L3 forwarding table 222, which use the affected L1 cut-through path, can be updated to not use the cut-through path 170. The router R8 190 could, for example, replace the next hop with L3 connectionless next hop. That is, just send packets to R7 at L3.

Figure 13:
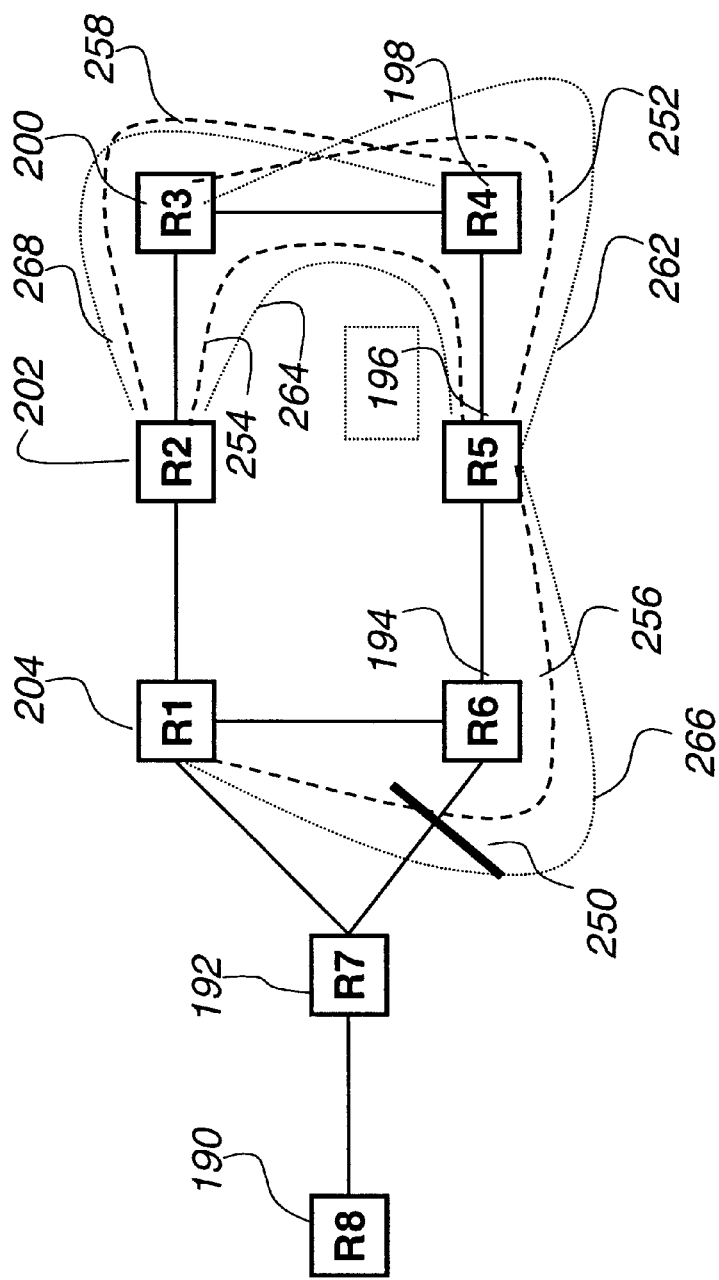
FIG. 13 illustrates a series of L1 cut-through paths based on the FIG. 10 topology.

Referring to FIG. 13 there is illustrated an L1/L2/L3 network in accordance with an embodiment of the present invention. The L1/L2/L3 network includes eight routers 190–204, all of which are MPLS capable and are thus Label Switching Routers (LSR). The L1/L2/L3 topology is aligned. L1 components could be SONET Ring, SONET link, TDM, or other similar technology. The following L1 cut-through paths are defined: R5-R4-R3, 252; R5-R4-R3-R2, 254; R5-R6-R1, 256; R4-R3-R2, 258. LSRs are configured with Strict Explicit Routed Label Switched Paths 262, 264, 266, 268, that correspond to the L1 cut-through path, 252–258, respectively. Each LSR knows:
  The existence of L1 cut-through paths that originate from it.
  Path details for each originating L1 cut-through path, specifically the routers that it bypasses and the terminating LSR. For example, R5 196 knows about three L1 cut-through paths 252, 254, 256 and their constituents R5-R4-R3, R5-R4-R3-R2, R5-R6-R1, respectively.
  Summary knowledge of L1 cut-through paths is propagated through the L3 network by the routing protocol. This includes only the endpoints and not the intermediate nodes. For example, router 196, R5, knows about the R4->R2 cut-through path 258, but not the intermediate nodes of that cut-through path.

For the network of FIG. 13, a backup router sequence (BRS) is defined to be a node and link disjoint path for a given L1 cut-through path. This is done over the routing topology, which in this case is also the L1 and L2 topology. For each L1 cut-through path originating on it, an LSR computes or pre-computes a BRS. This can be done dynamically on each LSR in response to topology changes and L1 cut-through path changes. An example of a dynamic computation is to prune physical links and intermediate nodes of each L1 cut-through path, then run a shortest path calculation on the remaining topology. To be able to always have a BRS, there is a restriction on the network of FIG. 13. The L1 topology should be engineered so that for any single link failure, all nodes remain connected over some alternative path.

In operation when a L1 failure occurs, all L1 cut-through paths over that link also fail. LSRs at the end points of those L1 cut-through paths detect this by L1 physical methods. For each failed L1 cut-through path, the LSR has a BRS. The LSR scans remaining L1 cut-through paths that originate from it to see if any of them have endpoints on the BRS. If so, the LSR can use any of them in constructing a new label switched path (LSP) which follow the BRS constituents. LSP setup procedures are used that are similar to those for explicit route (ER) setup with LDP, and follow the BRS from the L1 cut-through path endpoint to the destination of the failed L1 cut-through path.

The LSP could also be constructed in advance, i.e. pre-computed. That is, it is a backup LSP that is waiting to be used.

An L1 cut-through path can be selected whose endpoint is furthest in the BRS toward the destination LSR.

If there are no L1 cut-through path whose endpoints lie on the BRS, an ER-LSP is setup following the BRS. The network's LSP could subsequently be re-optimized periodically if desired.

Referring to FIGS. 14a) and b) there are illustrated the network topology of FIG. 13 with a failed link, and a node's instantaneous topology database view after the failure, respectively. In the network of FIG. 14a) a failure 270 has been introduced in link affecting L1 cut-through path 252, 254, 258. The network topology as viewed by router R5 196, is shown in FIG. 14b). Optical link R5-R3 fails. R5 196 immediately detects loss of two L1 cut-through paths 252, 254. Failed L1 cut-through paths are: (R5-R4-R3-R2) 254; (R5-R4-R3) 252; and (R4-R3-R2) 258. The router R5 196 does not immediately know about loss of L1 cut-through path (R4-R3-R2) 258 or link (R3-R4) as this is communicated in the L3 routing protocol.

Figure 15:
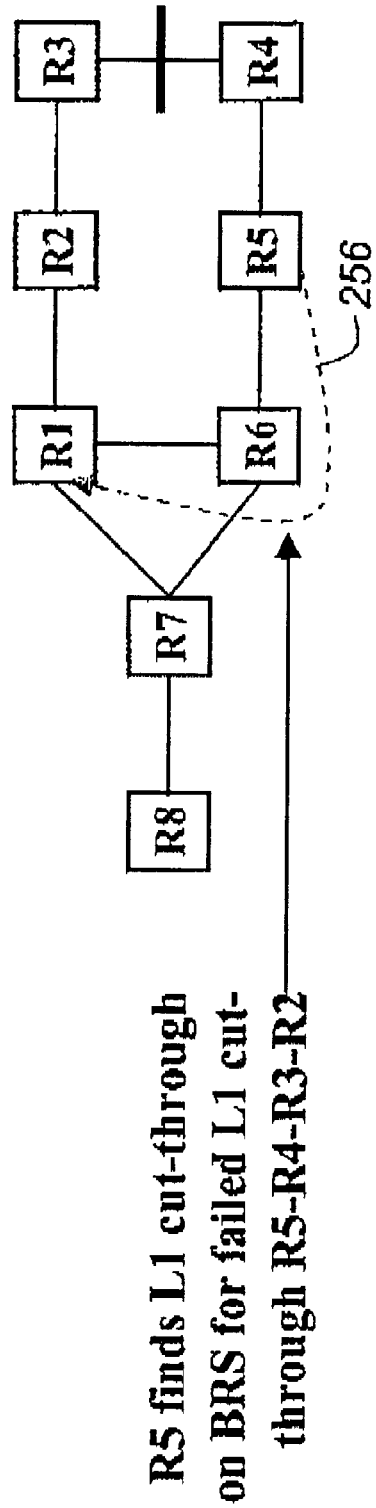
FIGS. 15 a) and b) illustrate the network topology of FIG. 14 a) showing only the L1 cut-through path not affected by the failed link and an LSP set up using the L1 cut-through path, respectively.
Figure 15:
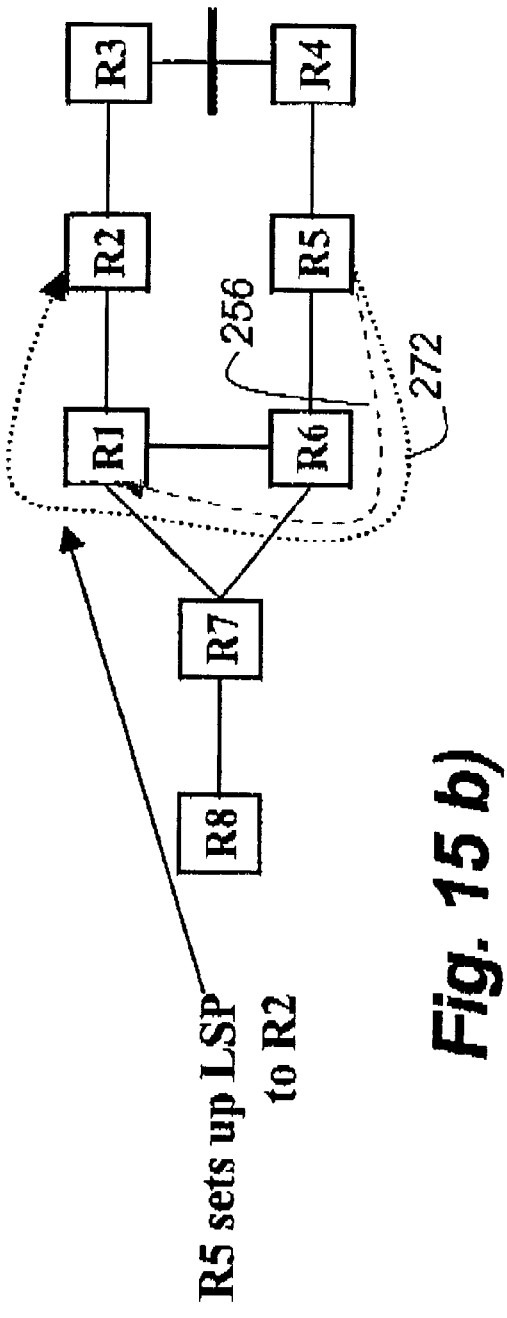

Referring to FIGS. 15a) and b) there are illustrated the network topology of FIG. 14a) showing only the L1 cut-through path not affected by the failed link and an LSP set up using the L1 cut-through path, respectively.

For L1 cut-through path (R5-R4-R3-R2) 254, its BRS is R5→R6→R1→R2. L1 cut-through path (R5-R6-R1) 256 is on the BRS and is useable for a portion thereof. The router R5 196 establishes an LSP 272 over R5→(R5→R6→R1) →R1→R2 that is stacked over L1 cut-through path (R5-R6-R1) 256.

Figure 16:
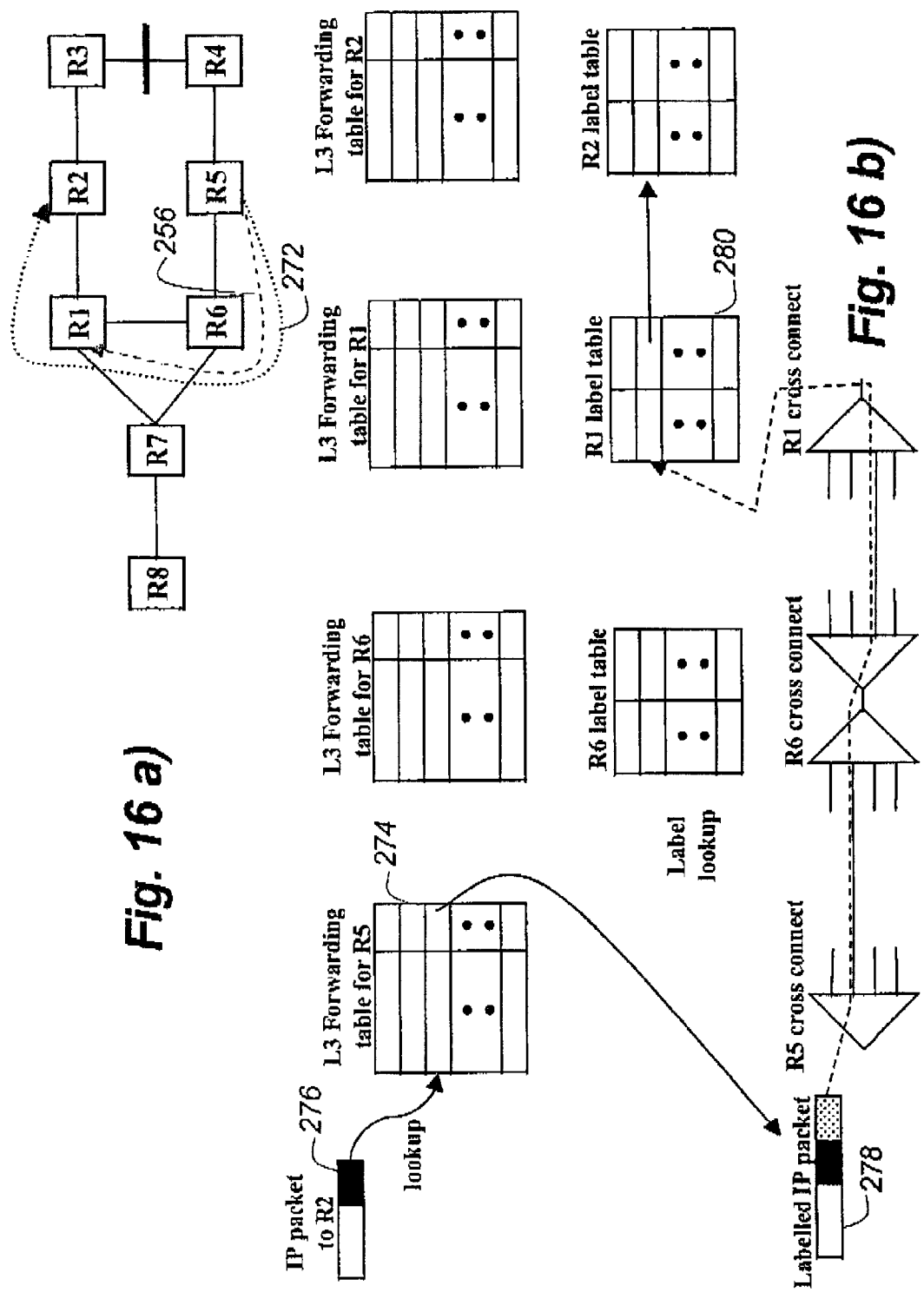
FIGS. 16a) and b) illustrate routing tables, label tables and cross-connects for the topology of FIG. 15b), and illustrate how data is forwarded on a recovery LSP that uses an L1 cut-through path.

Referring FIGS. 16a) and b) there is illustrated the router tables, label tables and cross-connects for the topology of FIG. 15b). The backup LSP 272 is now used in the IP Forwarding table 274 for packets 276 whose destination is router R2 202. Label swapping occurs at the router R1 204 using label table 280. Note how the L1 cut-through path (R5-R6-R1) 256 is used as the first hop in the backup LSP 272. When compared to a regular LSP setup over R5→R6→R1→R2, using the L1 cut-through path 256 saves a label swap operation in the router R6.

Figure 17:
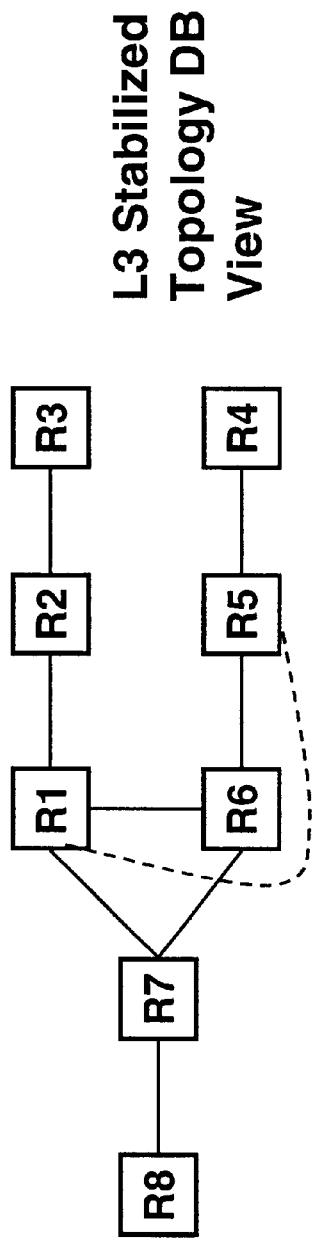
FIG. 17 illustrates an L3 stabilised topology database view after the failure has been used to update the L3 routing tables throughout the network.

In parallel with the failure sequence for the L1 cut-through path, the L3 routing protocol is updating the view of the topology through flooding and SPF re-calculation. This eventually produces a stable view of the topology at all LSR. Referring to FIG. 17 there is illustrated an L3 stabilized topology database view after the L3 routing protocol has adjusted to the failure and updated the L3 routing tables throughout the network.

Figure 18:
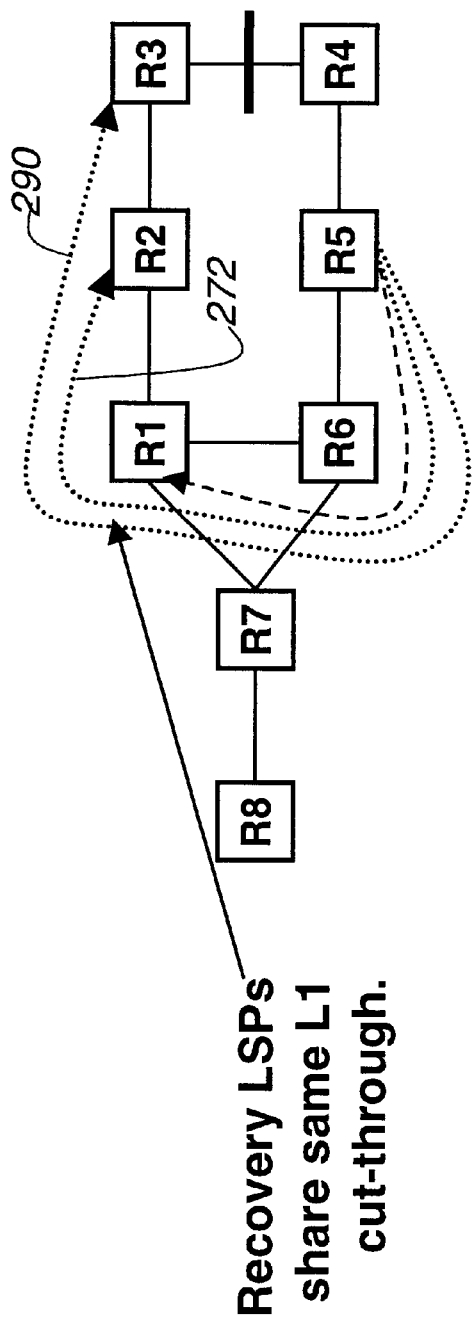
FIG. 18 illustrates how a router recovers from the failure of a second L1 cut-through path affected by the failure of FIG. 14.

Referring to FIG. 18 there is illustrated how a router recovers from the failure of a second L1 cut-through path affected by the failure of FIG. 14. R5 196 also handles the failure of L1 cut-through path (R5-R4-R3) 252. Its recovery LSP 290 is R5→(R5→R6→R1)→R1→R2→R3

Because the two recovery LSPs 272 and 290 from R5 are separately labeled, they can co-exist over the same L1 cut-through path path 256 that is used by their BRS. The router label table of R2 202 terminates the LSP 290 using the L1 cut-through path 256 (R5-R1-R2) and label swaps LSP R5-R1-R2-R3.

Figure 19:
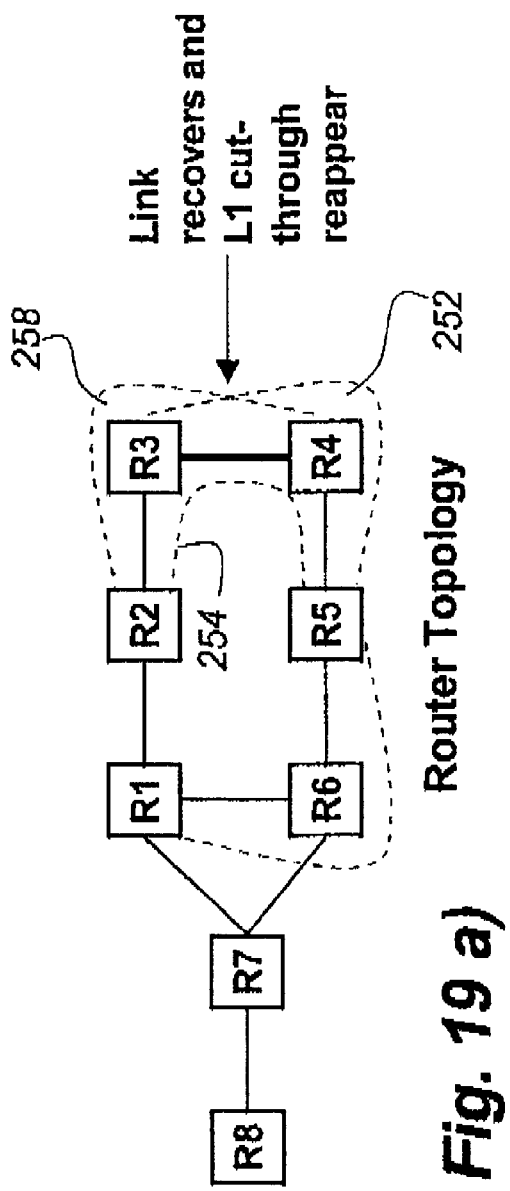
FIGS. 19 a) and b) illustrate a network topology when the failed L1 link recovers and L1 cut-through paths are automatically re-established by original configuration information, respectively.
Figure 19:
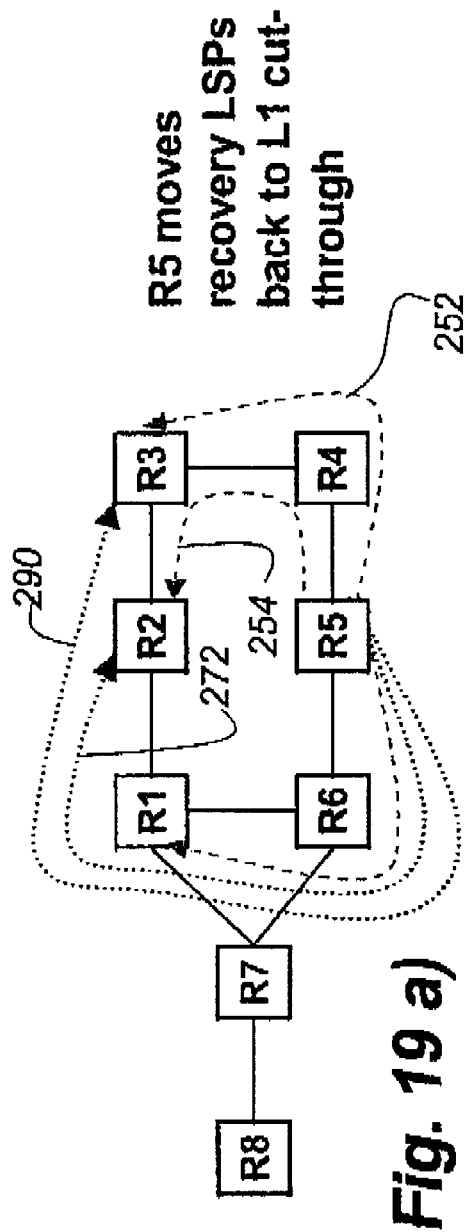

Referring to FIGS. 19a) and b) there is illustrated a network topology when the failed link recovers, L1 cut-through paths are automatically re-established by original configuration information, respectively. In FIG. 19a), when an LSR 196 (R5) sees a new L1 cut-through path (252 and 254), it checks to see if there is an LSP (272 and 290) that originates from the LSR 196 and could use the L1 cut-through path (252 and 254) as a full replacement. This LSP could be going over an existing L1 cut-through path (as in the previous failure scenario). It could also be an LSP just using L3 links. The traffic flow is redirected over the L1 cut-through path (252 and 290) after the SPF recalculates the forwarding table and then the recovery LSP (272 or 290) is either torn down or remains alive but unused.

Recovering to a restored L1 cut-through path (e.g., 252) is exactly like moving from a backup LSP (e.g., 290) to a primary LSP (e.g., 262).

Both LSP are valid entries in the IP Forwarding table, but the primary LSP takes priority due to configured precedence.

The embodiments of the invention described herein above have the following advantages:

- Detection of a L1 link failure by LSRs that are not on either end of the link is fast. That is, LSRs several hops away in the topology whose L1 cut-through paths go across the failed link, are informed quickly of the failure. This is relative to the speed at which an L3 routing protocol would inform of the failure.
- Use of the L1 cut-through path takes less processing at intermediate nodes than L3 or L2 forwarding.
- After a failure detection, the forwarding table can be quickly adjusted to use a backup LSP.
- This scheme "retrofits" static connections into the MPLS cut-through path forwarding mode, and thus enables existing MPLS configuration to be used for LSPs that overlay L1 cut-through paths.
- It relies on fast connection failure detection and could apply to any L1 network with this characteristic. For example:
  SONET networks (rings, point-to-point links)
  DWDM networks where L1 cut-through paths are wavelength channels
  TDM networks where L1 cut-through paths are TDM paths.

An alternative embodiment has two L1/L2/L3 switches share the same cross connect fabric, e.g., two routers attached to one SONET ADM.

In this case, the link between the two routers consists of one cross connection as opposed to multiple ones in a path. There is no physical link between the two LSRs and if the cross connect fabric itself fails, then this is treated like the failure of all L1 links attached to either LSR. Use of L1 cut-through paths with this switch embodiment works for failure and recovery of other links in the network.

A Backup Router Sequence could be a link disjoint path only as opposed to a node and link disjoint. If so, then the BRS could be affected by a node failure in the steady state L1 cut-through path.

What is claimed is:

1. A method of fault recovery for a network including the steps of:

establishing a physical topology for the network;

aligning a logical topology for the network with the physical such that a router at a L1 cut-though path end point views a L1 cut-through as a next hop; and using a fault indication from the physical topology to effect fault recovery in the logical topology.

2. A method as claimed in claim 1 wherein the step of establishing comprises the step of defining a node in the network as a combination of a cross connect and a router.

3. A method as claimed in claim 2 wherein the step of establishing comprises the step of interconnecting network nodes via the respective cross connects.

4. A method as claimed in claim 3 wherein the step of aligning includes a step of establishing a logical link corresponding each physical connection between nodes.

5. A method as claimed in claim 1 wherein the step of using includes the step of defining an alternative path and corresponding physical connection for each primary route.

6. A method as claimed in claim 5 wherein the step of defining an alternative path includes the step of defining a layer 2 link.

7. A method as claimed in claim 6 wherein the layer 2 link is a label switched path.

8. A method as claimed in claim 7 wherein the label switched path is predetermined.

9. A method as claimed in claim 7 wherein the label switched path is defined at the time of the fault indication.

10. Apparatus for data networking comprising:

a cross connect for switching at a physical layer;

a router for redirecting data packets at a logical layer coupled to the cross connect; and a fault recovery mechanism responsive to a fault indication in the physical layer for effecting a recovery in the logical layer.

11. Apparatus as claimed in claim 10 wherein the router includes an internetworking protocol (IP).

12. Apparatus as claimed in claim 11 wherein the cross connect is a synchronous optical network (SONET) add-drop multiplexor.

13. Apparatus as claimed in claim 11 wherein the cross connect is a time division multiplex (TDM) cross connect.

14. Apparatus as claimed in claim 11 wherein the internetworking protocol includes layer 3 routing.

15. Apparatus as claimed in claim 14 wherein the internetworking protocol includes layer 2 linking.

16. Apparatus as claimed in claim 15 wherein the internetworking protocol includes explicit route (ER) linking.

17. Apparatus as claimed in claim 16 wherein the internetworking protocol includes multi-protocol label switching (MPLS).

18. A network comprising:

a plurality of nodes, each node including a cross connect for switching at a physical layer, a router for redirecting data packets at a logical layer coupled to the cross connect and a fault recovery mechanism responsive to a fault indication in the physical layer for effecting a recovery in the logical layer;

a plurality of physical connections between nodes via the respective cross connects;

a plurality of logical routes between nodes via the respective routers; and an alternative logical route for use by the fault recovery mechanism.

19. The network as claimed in claim 18 wherein the router includes an internetworking protocol (IP).

20. The network as claimed in claim 18 wherein the cross connect is a synchronous optical network (SONET) add-drop multiplexor.

21. The network as claimed in claim 18 wherein the cross connect is a time division multiplex (TDM) cross connect.

22. The network as claimed in claim 19 wherein the internetworking protocol includes layer 3 routing.

23. The network as claimed in claim 22 wherein the internetworking protocol includes layer 2 linking.

24. The network as claimed in claim 23 wherein the internetworking protocol includes explicit route (FR) linking.

25. The network as claimed in claim 24 wherein the internetworking protocol includes multi-protocol label switching (MPLS).

26. In a network including a plurality of nodes and having a plurality of communications layers, a method of providing fault recovery comprising the steps of:

aligning at least a first and second layer of the plurality of communications layers such that a router on the second layer at a L1 cut-through path end point views a L1 cut-through of the first layer as a next hop;

for a given path in the first layer, defining a corresponding path in the second layer and an alternative path in the second layer, the alternative path in the second layer corresponding to an alternative path in the first layer disjoint from the given path; and on detection in the first layer of a fault in the given path. switching in the second layer from the corresponding path to the alternative path, whereby fault recovery in the network is provided in dependence upon speed of detection in the first layer.

27. A method as claimed in claim 26 wherein the first layer path is a physical connection between two nodes in the network.

28. A method as claimed in claim 27 wherein the physical connection is a cut-through path spanning several nodes in the network.

29. A method as claimed in claim 28 wherein the cut-through path is viewed as a next hop by a third layer of the plurality of communications layers.

30. A method as claimed in claim 26 wherein the second layer path is a label switched path.

31. A method as claimed in claim 27 wherein end points of the second layer path correspond to end points of the cut-through path.

32. A method as claimed in claim 26 wherein the alternative first layer path includes a first layer cut-through path between first and second nodes and a physical connection to a third node.

33. A method as claimed in claim 32 wherein the alternative second layer path uses the first layer cut-through path as a first hop.

34. A method as claimed in claim 26 wherein the given first layer path and the corresponding second layer path are designated as primary paths and the alternative first and second layer paths are designated as secondary paths.

35. A method as claimed in claim 34 wherein on the first designated path detecting that the fault no longer exists switching back to the primary paths.

36. A method as claimed in claim 26 wherein the step of switching in the second layer to provide fault recovery is independent of fault recovery in a third layer of the network.

* * * * *